(12) United States Patent
Parthasarathi et al.

(10) Patent No.: US 12,500,867 B2
(45) Date of Patent: Dec. 16, 2025

(54) CLOUD-HOSTED REMOTE ACCESS USING SECURE TUNNEL TRIGGERED BY EDGE DEVICES

(71) Applicant: Nvidia Corporation, Santa Clara, CA (US)

(72) Inventors: Anand Parthasarathi, Morrisville, NC (US); Binu Ramakrishnan, Fremont, CA (US); Joji Mekkattuparamban, Sunnyvale, CA (US); Philip J. Rogers, Austin, TX (US); Rajat Chopra, Santa Clara, CA (US); Satish Salagame, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 286 days.

(21) Appl. No.: 17/845,428

(22) Filed: Jun. 21, 2022

(65) Prior Publication Data

US 2022/0417215 A1    Dec. 29, 2022

Related U.S. Application Data

(60) Provisional application No. 63/214,275, filed on Jun. 24, 2021.

(51) Int. Cl.
*H04L 9/40* (2022.01)
(52) U.S. Cl.
CPC ............ *H04L 63/029* (2013.01); *H04L 63/04* (2013.01); *H04L 63/0884* (2013.01)
(58) Field of Classification Search
CPC .... H04L 63/029; H04L 63/04; H04L 63/0884
See application file for complete search history.

(56) References Cited

U.S. PATENT DOCUMENTS

| | | | |
|---|---|---|---|
| 2015/0058916 A1* | 2/2015 | Rostami-Hesarsorkh | ................... H04L 63/168 726/1 |
| 2016/0088068 A1* | 3/2016 | Toy | ...................... H04L 67/1097 709/219 |
| 2018/0063079 A1* | 3/2018 | Ding | .................... H04L 63/0464 |
| 2018/0270201 A1* | 9/2018 | Chanak | ................. H04L 9/3263 |
| 2019/0258781 A1* | 8/2019 | Qureshi | ................. H04W 12/64 |
| 2022/0103517 A1* | 3/2022 | Luotojärvi | .......... H04L 63/0876 |
| 2022/0158992 A1* | 5/2022 | Bendersky | ............ H04L 63/029 |
| 2022/0353244 A1* | 11/2022 | Kahn | ...................... H04L 67/12 |

OTHER PUBLICATIONS

Macchina.IO, Jun. 2, 2021, https://macchina.io/blog/internet-of-things/macchina-io-remote-manager-2-7-0-available, see attached PDF NPL provided. (Year: 2021).*

* cited by examiner

*Primary Examiner* — Hee Soo Kim
(74) *Attorney, Agent, or Firm* — Hogan Lovells US LLP

(57) ABSTRACT

Systems and methods include a cloud-hosted management plane where an authenticated user can initiate a request to establish a remote session to an edge device. A request may be transmitted to create a secure tunnel between the edge device and the cloud-based management plane. The edge device may receive and use a set of credentials to trigger a web-socket tunnel from the edge device to the cloud-hosted management plane. This connection may be used for management of an edge device(s), troubleshooting edge inferencing, access/use of edge applications, and various other applications.

20 Claims, 11 Drawing Sheets

CLOUD-HOSTED REMOTE ACCESS USING SECURE TUNNEL TRIGGERED BY EDGE DEVICES

CROSS-REFERENCE TO RELATED APPLICATIONS

This application claims priority to and the benefit of co-pending U.S. Provisional Patent Application No. 63/214,275, filed Jun. 24, 2021, and titled "CLOUD-HOSTED MANAGEMENT SERVICES FOR EDGE DEVICES," the full disclosure of which is hereby incorporated by reference in its entirety for all purposes.

BACKGROUND

An increasing number and variety of devices are being configured to connect and exchange data with other devices or systems over networks—such as the Internet. These devices, many of which are often referred to as smart devices, Internet of Things ("IoT") devices, or edge devices, often need to be able to identify, verify, and establish secure channels to other devices or systems with which they should communicate. However, because these devices can be sold and resold to multiple entities or associated with a wide variety of external systems, these devices typically are not produced with identification and/or verification information already stored thereon. As such, the devices have to obtain, or be provided with, information about these other devices or systems. Because many of these devices have limited (if any) display terminals or interfaces to configure them directly, or may be deployed in difficult to reach areas, remote configuration may be preferable—if not required. However, providing remote management of these devices in a public or shared data infrastructure can present additional challenges due to the multiple topologies, protocols, orchestrations, features, levels of virtualization or shared resource allocation, and supported specifications that can vary between systems, platforms, and even from device to device.

An example of the additional complexity presented by edge or other remote devices to cloud managed systems is the challenge of providing remote access to these devices when they are situated behind a local network firewall. Conventional secure solutions typically use an encrypted tunnel that is initiated from an edge device to be configured. Once the tunnel is established, a virtual network computing (VNC) session is initiated through the tunnel to access the edge device. However, in order to initiate the encrypted tunnel, physical access to the device's console is required. This can present difficulties when many devices must be configured concurrently, or when devices are deployed in difficult to reach areas.

BRIEF DESCRIPTION OF THE DRAWINGS

Various embodiments in accordance with the present disclosure will be described with reference to the drawings, in which.

DETAILED DESCRIPTION

Approaches in accordance with various embodiments overcome deficiencies of conventional techniques—such as those described above—by providing configuration functionalities for edge and remote devices through a cloud-management system. In at least one embodiment, the cloud-management system can include a cloud-management interface (e.g., cloud-hosted interface) executing on a cloud-management platform. In one or more embodiments, the cloud-management platform can comprise any platform that hosts or provides access to shared computing resources, and/or virtualized computing resources. According to one or more embodiments, a remote interface can be established with an edge device—e.g., an edge device behind a network firewall (e.g., a NAT firewall)—through a cloud-hosted management interface of a cloud-hosted management platform. The remote interface can be implemented with a command-line interface, e.g., as a remote shell session. In at least one embodiment, the edge device may be an edge device equipped with one or more GPUs or other parallel-processor based acceleration—e.g., parallel processing units (PPUs), accelerators, etc. In at least one embodiment, the edge device may be configured using the cloud-hosted management interface to forward data from any ports of the edge device to a cloud services layer.

Figure 1:
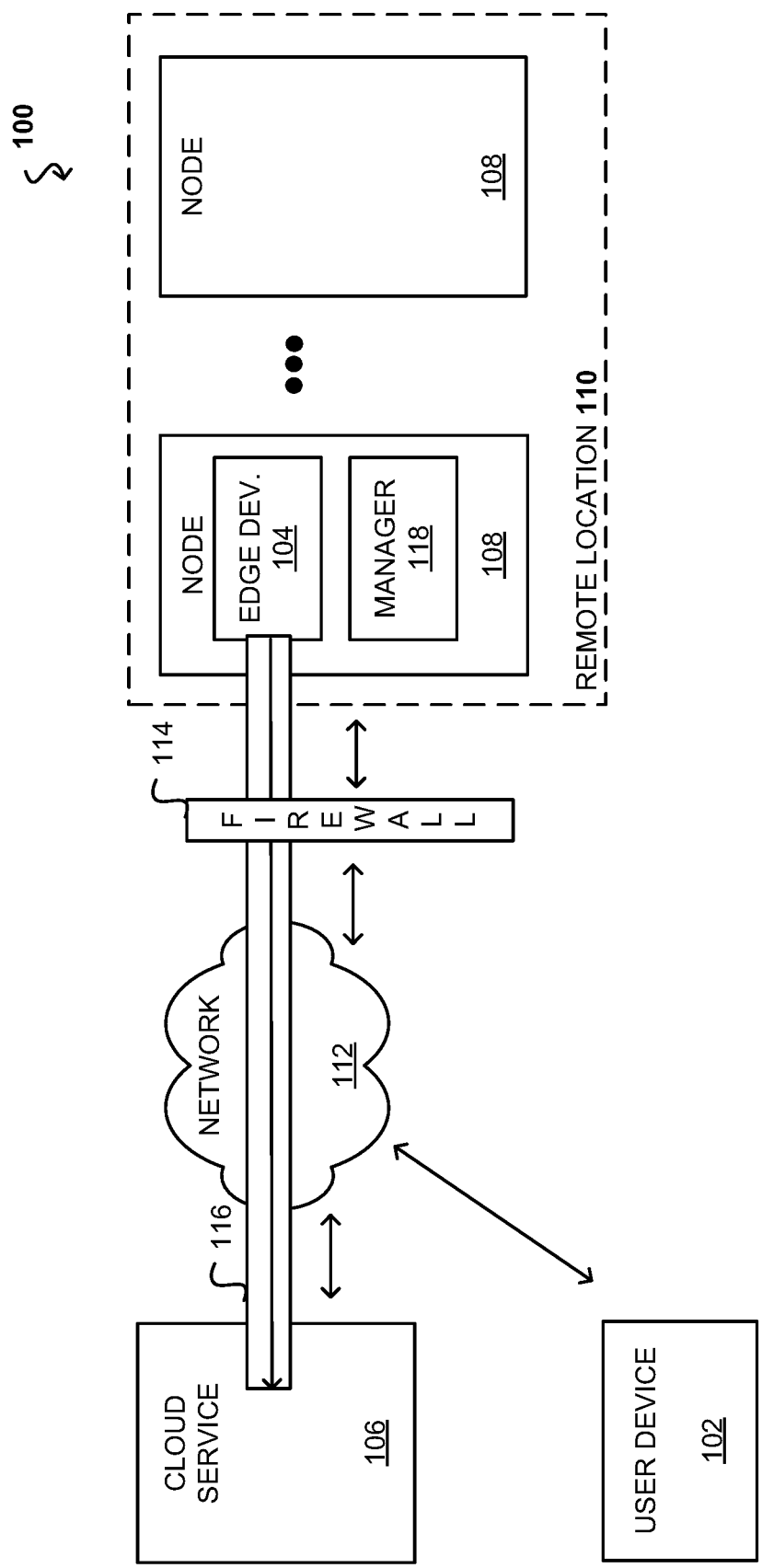
FIG. 1 illustrates an example of a communication environment between a cloud service and an edge device, according to at least one embodiment.

FIG. 1 illustrates an example network environment 100 that can be used to provide such functionality in accordance with at least one embodiment. In this example, an actor (e.g., a user) operating a user device 102 communicates with one or more edge devices 104 using a cloud service 106. It should be appreciated that the user device 102 is provided by way of example only, and in various embodiments, the request may be part of a data flow or sequence of operations executed in response to one or more inputs, and as a result, may be a request initialized by a server or other device. The actor and/or other requestor may be remote from a location of the edge devices 104. That is, the edge devices 104 may be difficult to access, may be positioned at locations that are inconvenient to access, and/or may otherwise be arranged such that physical access to the devices is undesirable. Furthermore, as noted, the edge devices 104 may be configured such that displays or native inputs are lacking, and as a result, even if direct access were available, it may be challenging or otherwise time consuming to configure or otherwise use the devices 104. In at least one embodiment, the edge devices 104 may be associated with IoT devices and/or may form portions of a node 108 associated with a remote location 110, such as a data center, a store, or the like. It should be appreciated that "remote" is described with respect to the user and that, in various embodiments, individual edge devices 104 of the node 108 may be in close proximity to one another and/or may be remote from one another. Additionally, the node 108 may include a variety of different devices 104 at different locations such that each edge device 104 may not be at the same remote location 110.

In this example, the user device 102 may access the cloud service 106 via one or more networks 112. The user device 102 may be associated with a registered user that has an account with the cloud service 106, for example a cloud management service that is associated with the cloud service 106. The cloud service 106 may be a platform that hosts or provides access to shared computing resources, and/or virtualized computing resources. Additionally, the cloud service 106 may further provide access to or use of various other applications, which may be used to monitor or otherwise control components associated with the cloud service's various offerings. To access the cloud service 106, or components or features thereof, the user device 102 may provide or transmit one or more credentials for evaluation by the cloud service 106. Once the credentials are validated, the user device 102 may be granted access to the cloud service 106. Access to the cloud service 106 may be restricted or controlled in accordance with the user's credentials, such that the user is permitted to perform only a certain set of operations or commands in accordance with their access level.

In this example, the remote location 110 and/or the edge devices 104 are positioned behind a firewall 114, such as a NAT firewall. The firewall 114 may be established to protect a private network associated with the node 108 and/or the remote location 110. Accordingly, one or more components behind the firewall 114 may not be accessible from the network 112. It should be appreciated that "behind" indicates that incoming transmissions to the edge device 104 and/or outgoing transmission from the edge device 104 are restricted or otherwise blocked by the firewall 114. In other words, a communication pathway between the cloud service 106 and the edge device 104 is blocked or otherwise restricted in accordance with one or more parameters of the firewall 114. It should be appreciated that the firewall 114 is provided by way of non-limiting example and various other security or communication restrictive protocols may be used to control or limit communication with respect to the edge devices 104. As a result, direct communication between the cloud service 106 (e.g., the user device 102) and one or more edge devices 104 is blocked, which may reduce functionality, such as remote configuration, remote diagnostics, and the like, in exchange for enhanced security.

Traditionally, communication channels to the edge device 104 could be established using a virtual network container (VNC) on the edge device 104. This solution is problematic for a variety of reasons, such as being a bulkier, larger system, taking time to set up, and often having errors with key generation. Embodiments of the present disclosure overcome this problem by establishing a cloud-hosted management plane that may be accessible by the user device 102 and also permit communication with one or more edge devices 104. In various embodiments, a tunnel 116 (e.g., a secure tunnel) is generated from the edge device 104 to the cloud service 106, for example upon receipt of an instruction from a node manager 118. This tunnel 116 may permit the edge device 104 to pull or otherwise retrieve information from the cloud service 106, such as configuration information, among various other options. In various embodiments, the tunnel 116 may be considered an outbound tunnel in that egress is allowed, but ingress is blocked or otherwise restricted. However, embodiments are not limited to a single traffic direction and the tunnel 116 may permit two-way data transfer. Accordingly, the cloud service 106 may include the management plane to provide an end-to-end solution for managing and using edge devices 104 with secure communications.

According to one or more embodiments, a process is provided to establish a remote shell session or other user interface with one or more edge devices 104 behind network firewall(s) 114 through a cloud-hosted management system, for example a system that is hosted or accessible via the cloud service 106. In at least one embodiment, the process begins with the receipt of user input via an interface of the cloud-hosted management system indicative of an intent to establish a remote session to an edge device communicatively coupled to the cloud-hosted management system via a network (e.g., the Internet). Next, the cloud-hosted management system generates a declarative chart of credentials accessible to the edge device. In an example scenario, the edge device is provided unilateral access to one or more cloud services hosted on the cloud-hosted management system. Then, a web-socket tunnel is triggered and established by the edge device to one or more cloud services accessible via the cloud-hosted management system.

Once a web-socket connection is successfully created, the one or more cloud services establishes a secure connection, such as (without limitation) a secure shell protocol (SSH) connection to the device using a certification. In one or more embodiments, the certification may be implemented using, for example and without limitation, a Secure Sockets Layer (SSL) certification signed with a public key. The edge device verifies the signed certification by referencing a pre-stored corresponding public key, which may be provided to the edge device when provisioned, for example. In one or more embodiments the cloud services can include services and functionality to configure the edge device, to establish command line interface or other remote shell session. An (authorized) user is thereafter provided access to this functionality and/or interface of the edge device through the cloud-hosted management system.

In one or more embodiments, a local or on-premise server associated with the edge device and also communicatively coupled to the cloud-hosted management system may be configured to listen only at localhost addresses to ensure this service is secure by design. In at least one embodiment, the server may be implemented or otherwise configured as an SSH server. Since remote shell sessions established in this way are SSH sessions, direct monitoring of edge devices can be enabled in this manner irrespective of the state of any container orchestration system. Moreover, for embodiments that establish the tunnel as a web-socket tunnel, multiple sessions can be multiplexed, and a separate log or registry can be maintained for each SSH session for auditing authorization and activities. In at least one embodiment, the tunnel (e.g., web-socket tunnel) is managed by the cloud services layer, so timeouts are handled out of band, which provides applications running in the edge device additional security.

In contrast to conventional approaches, embodiments disclosed herein are able to initiate remote access sessions from the cloud services layer, irrespective of the state of any container or cluster orchestration system executing on the device. According to embodiments, the cloud-hosted management system is capable of supporting multiple concurrent sessions and multiple sessions with multiple users, with each session having its own audit and/or activity log.

Accordingly, embodiments may be directed to systems and methods for establishing secure access to edge devices from a cloud interface. Embodiments include a cloud-hosted management plane where an authenticated user can initiate a request to establish a remote session to an edge device. Because the edge device is sitting behind a firewall, communication to the edge device may be blocked. To create the tunnel, multiple levels of authentication are used, including authentication of the user at the cloud-hosted management plane, authentication of both the device and the cloud domain (e.g., via mutual TLS), authentication using certifications and credentials to provide access to the edge device, and/or a proxy authentication. The tunnel is a communication tunnel that is established at the edge device up to the cloud service. Upon establishment of the tunnel, a unique DNS URL may be generated and then users may be provided access through a browser (e.g., secure shell access), in order to access the edge device. This connection may be used for management of edge device(s), troubleshooting edge inferencing, access/use of edge applications, and various other applications.

In at least one embodiment, a process may be used to receive at a cloud-hosted management interface of a cloud-hosted management system, user input data indicative of an intent to create a remote access session to an edge device. Additionally, the process may be used to transmit credential data to the edge device and establish a secure tunnel to one or more cloud services using the credential data. The process may also be used to establish, using the one or more cloud services, a connection to the edge device using a certification. Furthermore, the process may be used to perform one or more operations corresponding to at least one cloud service of the one or more cloud services using the edge device.

Various embodiments may be provided where the credential data comprises a declarative chart of credentials and the remote access session comprises a remote shell session. Furthermore, the secure tunnel may comprise a web-socket tunnel. Additionally, the certification may comprise a signed Secure Sockets Layer (SSL) certification. Moreover, the certification may be verified at the edge device using a public key provided to the edge device when the edge device is provisioned. Additionally, establishing the connection may include establishing a connection with a local server corresponding to the edge device, and the local server may include a secure shell protocol (SSH) server to listen to localhost addresses. In some embodiments, establishing the tunnel may incorporate multiplexing a plurality of concurrent remote access sessions, and/or may include establishing remote access sessions with one or more edge devices. Furthermore, an activity log may include activity information corresponding to each remote access session that is maintained using the cloud-hosted management system. In at least one embodiment, the one or more cloud services includes direct monitoring of computing resource usage by the edge device. In embodiments, the edge device may execute one or more machine learning applications.

In at least one embodiment, a processor includes one or more processing units to receive user input data indicative of an intent to create a remote access session to an edge device at a cloud-hosted management interface of a cloud-hosted management system, transmit credential data to the edge device, establish a secure tunnel to one or more cloud services using the credential data, establish a connection between one or more cloud services to the edge device using a certification, and perform one or more operations corresponding to at least one cloud service of the one or more cloud services using the edge device. In various embodiments, the credential data includes a declarative chart of credentials. Additionally, the remote access session may be a remote shell session and the secure tunnel may be a web-socket tunnel. Furthermore, the certification may be a signed Secure Sockets Layer (SSL) certification. The certification may be verified at the edge device using a public key provided to the edge device when the edge device is provisioned. Additionally, in at least one embodiment, the one or more processing units are to establish the connection by establishing a connection with a local server corresponding to the edge device. The local server may include a secure shell protocol (SSH) server to listen to localhost addresses. In some embodiments, the one or more processing units may establish the tunnel by multiplexing a plurality of concurrent remote access sessions and/or establish the tunnel by establishing remote access sessions with one or more edge devices. In various embodiment, an activity log includes activity information corresponding to each remote access session maintained using the cloud-hosted management system. Furthermore, the one or more cloud services include direct monitoring of computing resource usage by the edge device. Additionally, in at least one embodiment, the edge device executes one or more machine learning applications.

Figure 2:
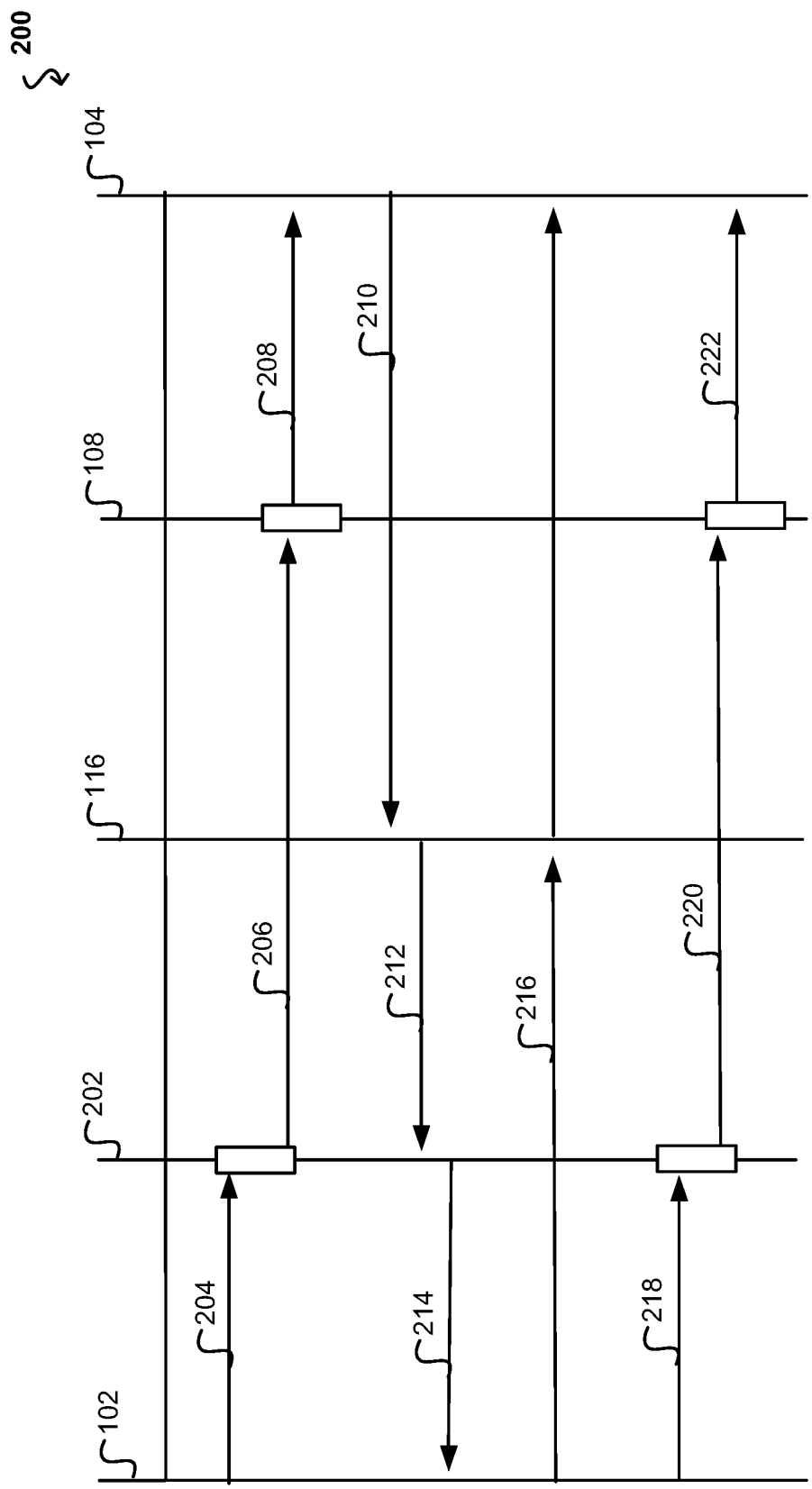
FIG. 2 illustrates an example flow for establishing a secure tunnel connection between a cloud service and an edge device, according to at least one embodiment.

FIG. 2 illustrates a flow diagram 200 that may be used to establish and implement a tunnel between a cloud management system and an edge device in accordance with one or more embodiments. In this example, remote management of one or more edge devices 104 may be performed by the user device 102, associated with one or more authorized actors, via an access portal, such as a browser portal associated with a cloud service. Various embodiments may include an edge management service (EMS) application programming interface (API) 202 that acts as a management plane hosted at the cloud service. For example, the EMS API 202 may receive instructions or requests from an authorized user device 102. It should be appreciated that the user device 102 is provided by way of example only, and in various embodiments, the request may be part of a data flow or sequence of operations executed in response to one or more inputs, and as a result, may be a request initialized by a server or other device. Further embodiments may also include the tunnel 116, which may be a transport layer security (TLS) tunnel that opens from the edge device 104 to the cloud service (e.g., the EMS API 202).

In this example, the user device 102 transmits a request 204 to the EMS API 202. It should be appreciated that the request 204 may be transmitted after the user device 102 has logged into or otherwise been authenticated by the cloud service associated with the EMS API 202. For example, the user device 102 may present credentials which are evaluated and approved. Additionally, the credentials may further only be associated with a subset of potential operations within the cloud service, and as a result, the request 204 may also be checked against a list of permissions associated with the user device 102 (e.g., the account associated with the user device) to determine whether the request 204 is an authorized or permitted request. If the request 204 is authorized, the request may be processed at the EMS API 202 and published or otherwise made available 206 to the node 108. For example, the node 108 and/or the node manager 118 may be frequently checking or otherwise pulling information from the cloud service, for example, via a secure connection. As noted, the node manager 118 may be in communication with the cloud service, such as through a network, and may also enable local control or execution of various node commands. The node manager 118 may be a server, for example, configured to listen only at localhost addresses to ensure embodiments of the present disclosure are secure by design.

Upon receipt the request 204, for example by pulling information from the cloud service, the node 108 may configure 208 one or more edge devices 104 for remote tunnel communication. In at least one embodiment, the edge devices 104 may undergo one or more authentication processes, for example, to authenticate both the edge device 104 and the cloud service 106. The edge device 104 may then establish a connection 210 via the remote tunnel 116. In at least one embodiment, the tunnel 116 may originate from the edge device 104. In certain embodiments, the tunnel 116 may be considered an outbound or egress tunnel, in that the cloud service cannot directly connect through the tunnel 116, but the edge device 104 may retrieve information from the cloud service via the tunnel 116. In various embodiments, the tunnel 116 is a rules-based tunnel, where different access rules may be established based, at least in part, on user preferences. The tunnel 116 may be different from opening a port in the firewall, for example, because use of the tunnel 116 does not weaken or otherwise modify the firewall, but rather, provides an alternative and direct secure communication pathway to the edge device 104.

To provide the user device 102 with access to the edge device 104, a unique DNS URL may be generated and provided 212 at the EMS API 202, which may return 214 that URL to the user device 102. As a result, the user device 102 may now access the edge device 104 via a portal, such as a browser. The user device 102 may now communicate with the edge device 104, which may include transmitting an instruction 216 via the tunnel 116. This instruction 216 may include configuration instructions, instructions to perform one or more operations, such as machine learning operations, or the like. Additionally, the instruction 216 may be used for maintenance or other management capabilities, among other options.

In various embodiments, the tunnel 116 may remain active for periods of time, which may be periodically checked to determine whether the tunnel 116 should be closed. Additionally, the user device 102 may also close tunnels, for example, once operations are complete. The user device 102 may transmit a closure request 218 to the node 108, for example to the node manager 118, via the EMS API 202. The node 108 may receive a closure instruction 220 from the EMS API 202 and then transmit instructions 222 to the edge device 104. In this manner, tunnels 116 may be kept open for periods of time as needed, but may also be directly or periodically purged.

Figure 3:
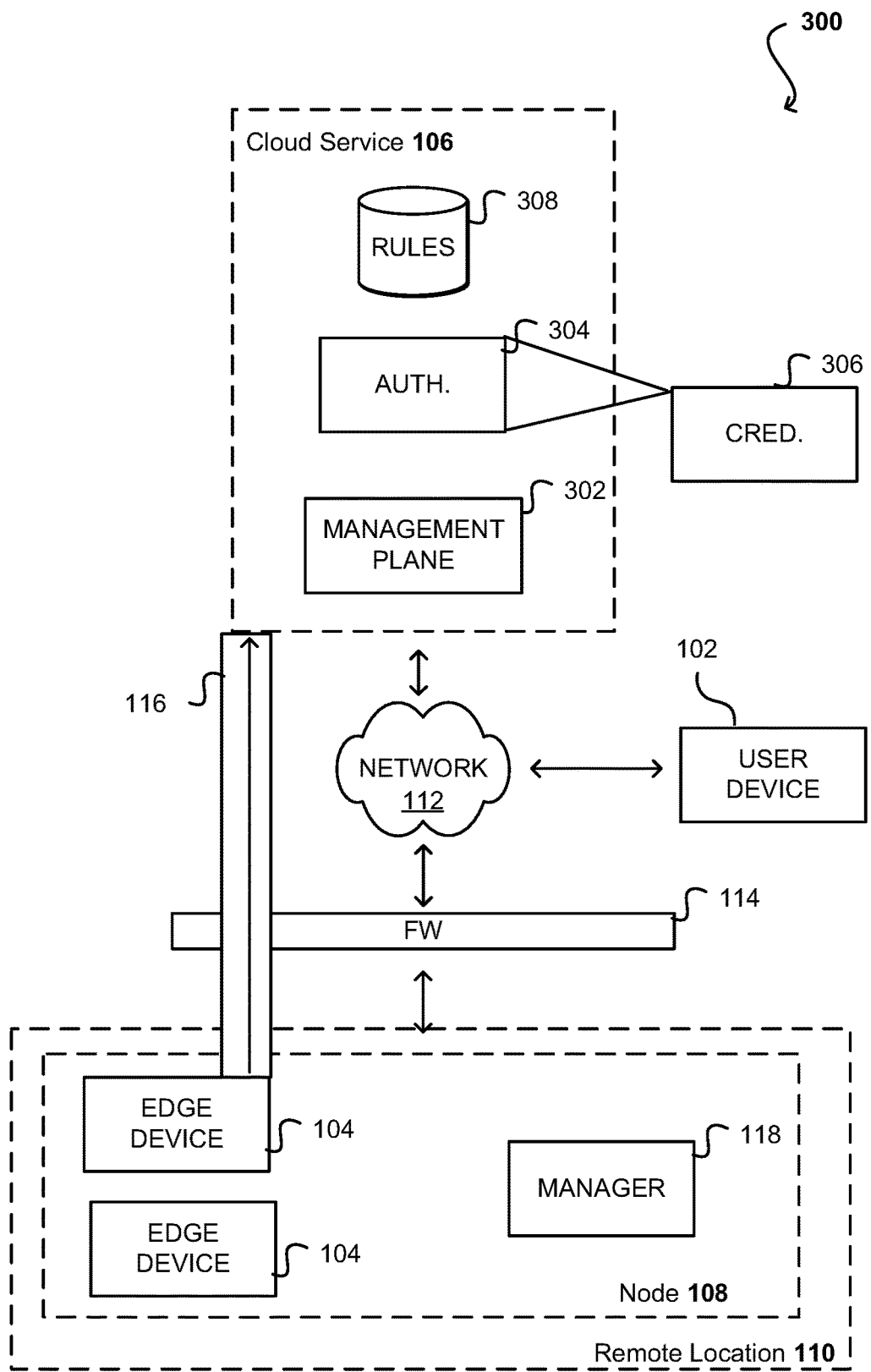
FIG. 3 illustrates an example of a communication environment between a cloud service and an edge device, according to at least one embodiment.

FIG. 3 illustrates a connection and control environment 300 where a management plane 302 hosted at the cloud service 106 may be used as an interface for the user device 102 to control, maintain, or otherwise establish secure communication with one or more edge devices 104. In this example, the user device 102 may communicate, over the network 112, with the cloud service 116 to establish a connection for remote communication with the one or more edge devices 104. The user device 102 may provide one or more credentials, which are evaluated by an authentication service 304, to determine whether the user device 102 is authorized to access the cloud service 106, and moreover, to determine the extent of operations the user device 102 may request or perform. For example, the user device 102 may have limited permissions, which may be set by one or more administrators. The credentials may include information such as a username/password, a token, or the like.

The user device 102 may transmit an intent to establish a secure communication with the edge device 104, for example by submitting a command or request to the management plane 302. The management plane 302 may be used to communicate the intent to the edge device 104, for example, via the manager 118, by instructing the authorization service 304 to publish or to make available a declarative chart of credentials 306 for the edge device 104 to pick up. These credentials 306 may be pulled or otherwise acquired at the node 108 via the manager 118, which may be connected and managed at the cloud service 106. For example, the manager 118 may periodically monitor or watch for different commands or signals and then pull information down from the cloud service 106, such as the credentials 306, among other options.

In at least one embodiment, multiple layers of authentication may be used prior to, along with, or after establishing the connection between the edge device 104 and the cloud service 106 via the management plane 302. For example, both the cloud service 106 and the edge device 104 may be independently authenticated, such as by using mutual TLS. Additionally, one or more certificates may be exchanged between the cloud service 106 and the node 108 and/or the edge device 104. Moreover, one or more proxy authentications may also be used. The tunnel 116 (e.g., web-socket tunnel) is triggered from the edge device 104 to the cloud service 116 using the credentials 306 published by the cloud service 106. For example, an SSH connection may be established to the edge device 104 using a signed SSL certificate that is verified by a public key provided to the edge device 104 at provisioning time. In various embodiments, the manager 118 is established as a local SSHD server that only listens at localhost addresses, thereby providing a secure-by-design service with the present embodiments. Because the tunnel 116 allows for establishment of a SSH session, systems and methods do not rely on the state of a container orchestration system for communications, and as a result, direct monitoring of GPU systems is enabled.

In this example, a single tunnel 116 is established to the cloud service 106, but it should be appreciated that multiple different tunnels 116 may extend between different edge devices 104, where different edge devices 104 may also be part of different nodes 108 and/or at different remote locations 110. However, in various embodiments, a given edge device 104 may only be associated with a single tunnel 116.

In various embodiments, the management plane 302 may continue to monitor or otherwise control various features associated with the tunnel 116. For example, the management plane 302 may be used to audit activity for given tunnels 116. Furthermore, the management plane 302 may be used to handle timeouts or otherwise end connections. For example, one or more rules 308 may be used to determine whether a connection should be reset or otherwise ended. The rules 308 may correspond to different periods of time (e.g., requirements to re-establish a connection after a given period of time) or may be associated with providing updated credential or token information, among other potential options. In this manner, the connection may be monitored and managed via the could service 106.

Embodiments of the present disclosure provide for dynamic creation of tunnels, on demand, from edge devices to a cloud service provider. As a result, the edge device may pull or otherwise receive information from the cloud service provider, which may include user provided information such as configuration parameters or requests to execute various applications on the edge device. In at least one embodiment, the user device 102 accesses the management plane 302 through a portal, such as a webpage, via a unique DNS URL. In this manner, a user may benefit from a central location to manage or execute operations of various edge devices that may otherwise be difficult to access.

Figure 4A:
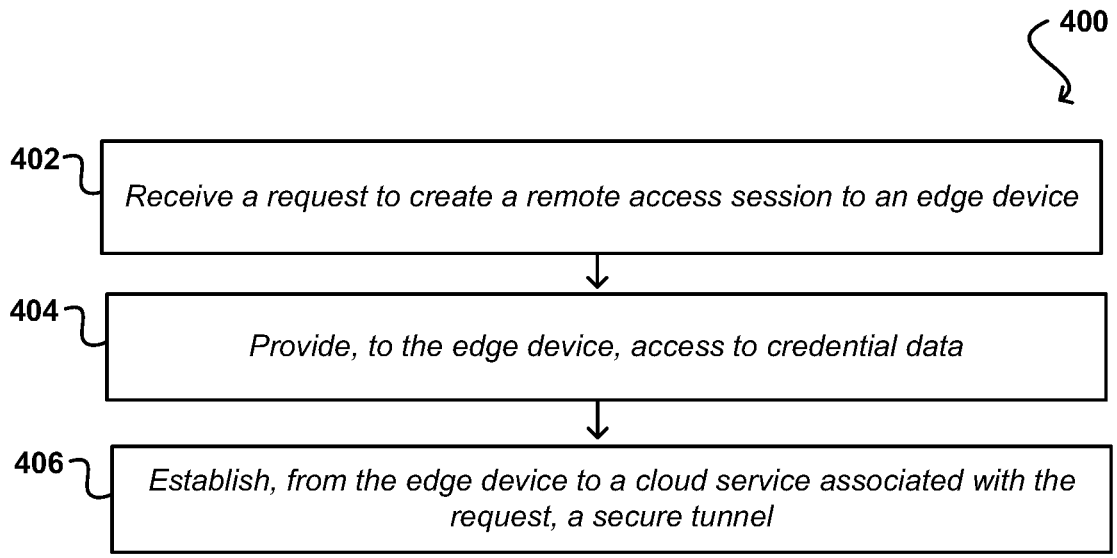
FIG. 4A illustrates an example flow chart of a process for establishing a secure tunnel connection, according to at least one embodiment.

FIG. 4A illustrates an example process 400 for establishing a secure tunnel between an edge device and a cloud service. It should be understood that for this and other processes presented herein that there can be additional, fewer, or alternative operations performed in similar or alternative order, or at least partially in parallel, within the scope of various embodiments unless otherwise specifically stated. In this example, a request to create a remote access session to an edge device is received 402. In at least one embodiment, the request may be received at a management platform associated with a cloud service. Additionally, the request may further be transmitted or otherwise provided to a node controller associated with the edge device. The edge device may be provided credential data 404. For example, the edge device may be provisioned to include a public key, may receive credentials verifying authenticity of the cloud service, or the like. A secure tunnel may then be established from the edge device to the cloud service 406. The secure tunnel may be a web-socket tunnel to establish an SSH connection between the edge device and the cloud service using a signed SSL certificate, which may be part of the credential data. In this manner, a user may access the management platform through an API and interact with the edge device, such as to configure the edge device, access applications of the edge device, direct operations on the edge device, or the like.

Figure 4B:
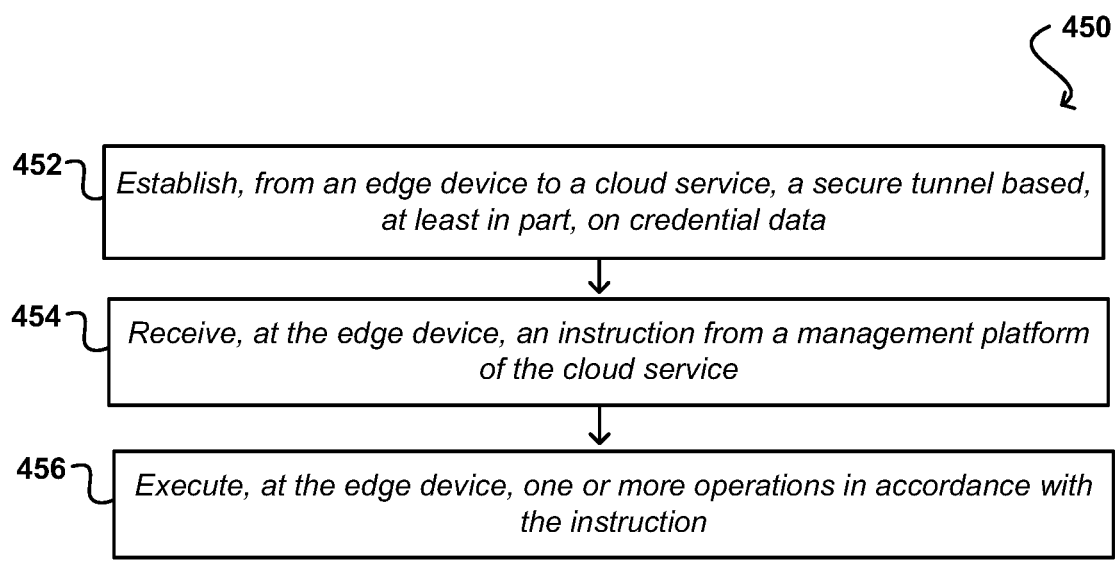
FIG. 4B illustrates an example flow chart of a process for executing an operation at an edge device, according to at least one embodiment.

FIG. 4B illustrates an example process 450 for operating an edge device via cloud-hosted management service. In this example, credential data is used to authenticate and establish a secure tunnel between an edge device and a cloud service. The edge device may then be prepared to receive requests or instructions from the cloud service 454, for example, via the secure channel. Upon receipt of the instructions, the edge device may then execute one or more operations 456, such as configurating operating parameters of the device, executing one or more machine learning operations, or the like.

Figure 5:
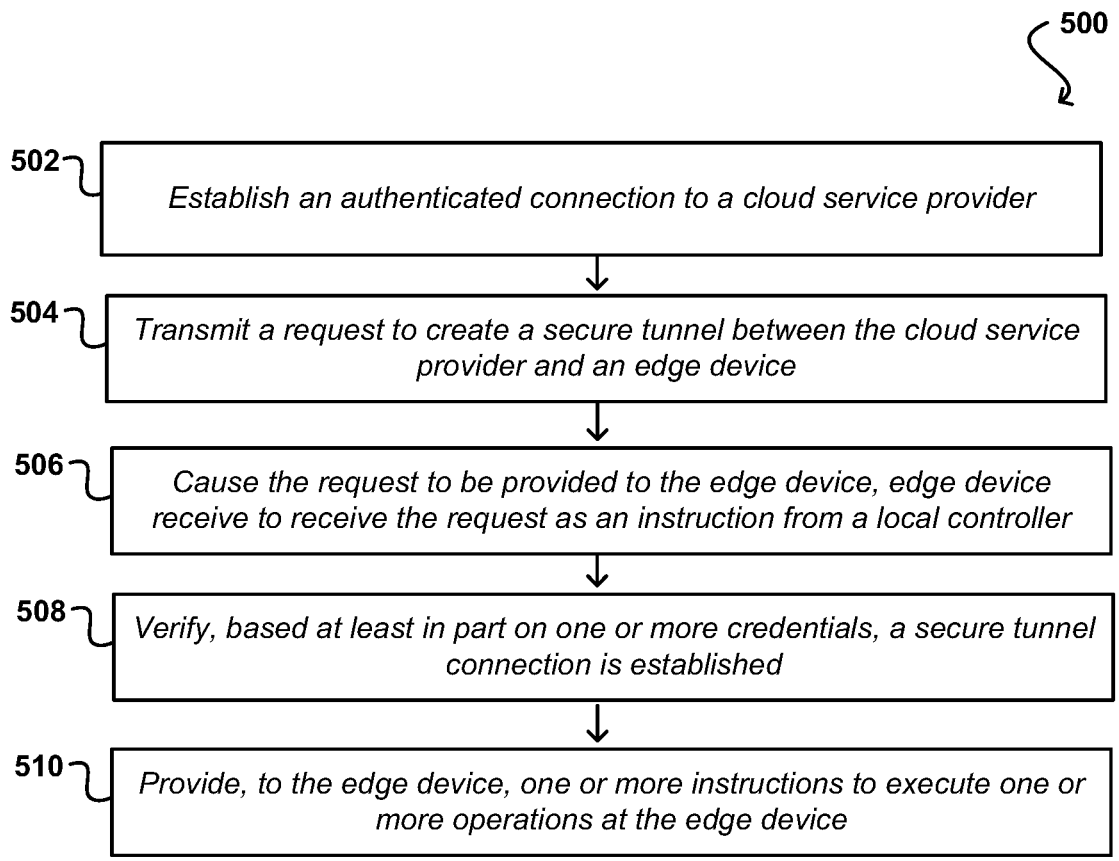
FIG. 5 illustrates an example flow chart of a process for establishing a secure tunnel connection, according to at least one embodiment.

FIG. 5 illustrates an example process 500 for providing instructions to an edge device via a secure tunnel. In this example, an authenticated connection is established at a cloud service provider 502. An authenticated user may provide credentials to a cloud service provider and, upon verification of the credentials, may be granted access to one or more operations associated with the cloud service provider. In at least one embodiment, the user may transmit a request to create a secure tunnel between the cloud service provider and an edge device 504. For example, the user may provide the request through an API associated with the cloud service provider. The submission of the request may cause the request to be provided to the edge device 506. The edge device may be part of a node associated with a remote location, such as a datacenter, where the node is associated with one or more local controllers. For example, the edge device may be part of a node on a private network at the remote location. The controller may receive the request, such as by pulling the request after it is published or otherwise made available through a secure connection. The controller may then provision and enable establishment of the secure connection. The secure connection may be verified based, at least in part, on one or more credentials 508. For example, the user may submit a token or certificate or may receive an indication that the connection is established. After establishing the connection, the user may provide, to the edge device and via the secure tunnel, one or more instructions to execute one or more operations at the edge device 510.

Figure 6:
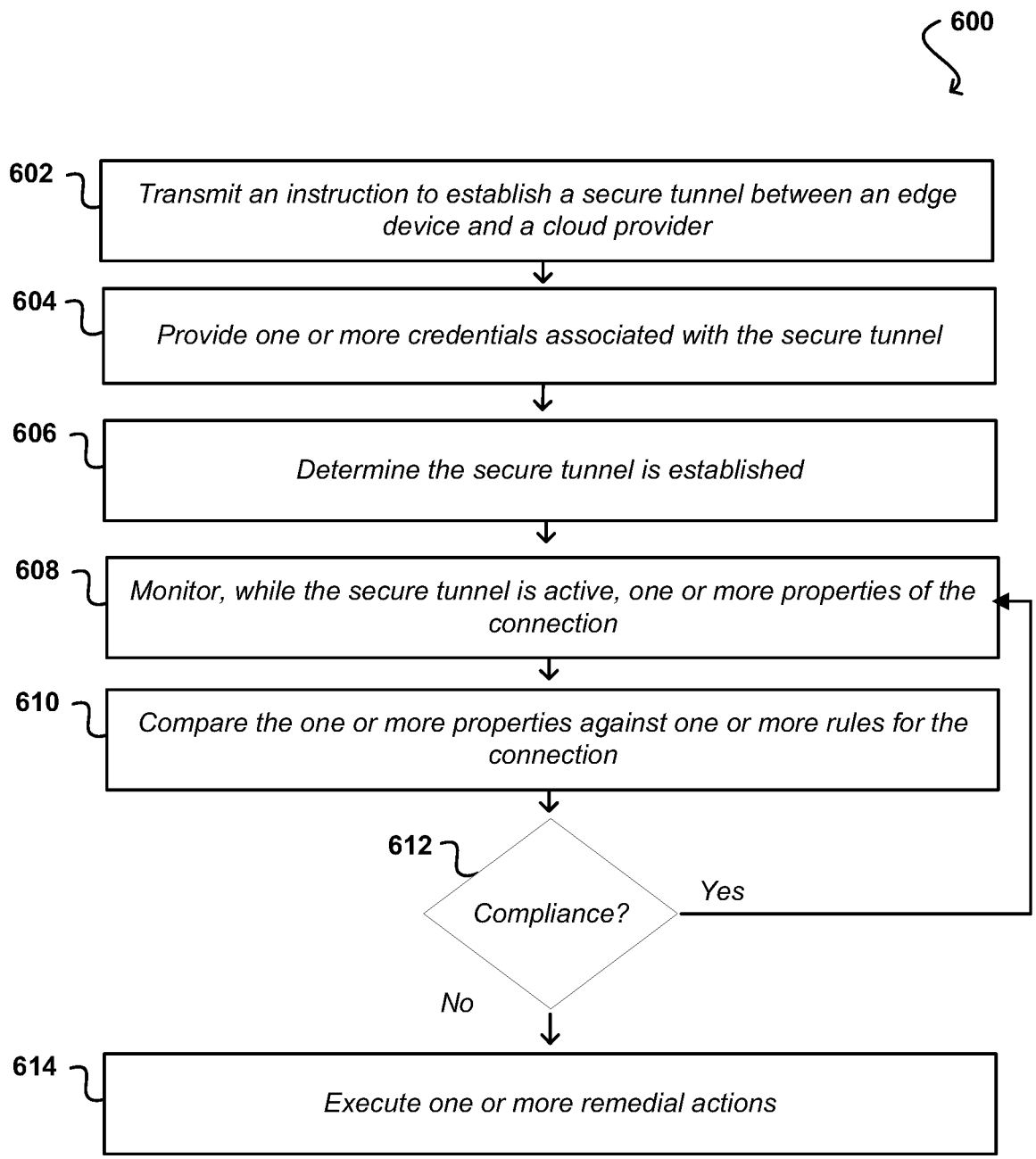
FIG. 6 illustrates an example flow chart of a process for monitoring a secure tunnel connection, according to at least one embodiment.

FIG. 6 illustrates an example process 600 for monitoring a connection between an edge device and a cloud service. In this example, an instruction to establish a secure connection between an edge device and the cloud service is transmitted 602. For example, the cloud service may be associated with a management plane that may receive requests from one or more authorized users. The management plane may then transmit the request to a local controller associated with one or more edge devices. One or more credentials may also be provided in addition to, or made available associated with, the request 604. The credentials may include a published declarative chart of credentials that is accessible by one or more of the edge devices or the local controller. The establishment of the secure tunnel may then be verified 606. Verification may include one or more authentication operations, a test communication, and/or the like. In at least one embodiment, the connection between the edge device and the cloud service is a monitored connection that the management plane may manage, and one or more properties associated with the connection may be monitored 608. Properties may include factors such as a total time of connection activity, a down time or delay between requests, a number of users using a connection, a life of an authorizing credential, and the like. These properties may then be compared against one or more rules established for the connection 610. The ruled-based connection may have one or more restrictions to reduce a likelihood the connection is idle or becomes compromised. For example, there may be a limited period of time for the connection life before additional credentials are required to re-establish the connection. The monitored properties may then be checked for compliance with the rules 612, where a compliant property enables further monitoring while a non-compliant property may lead to a remedial action 614, such as termination of the connection or a request for additional credentials, among other options.

Data Center

Figure 7:
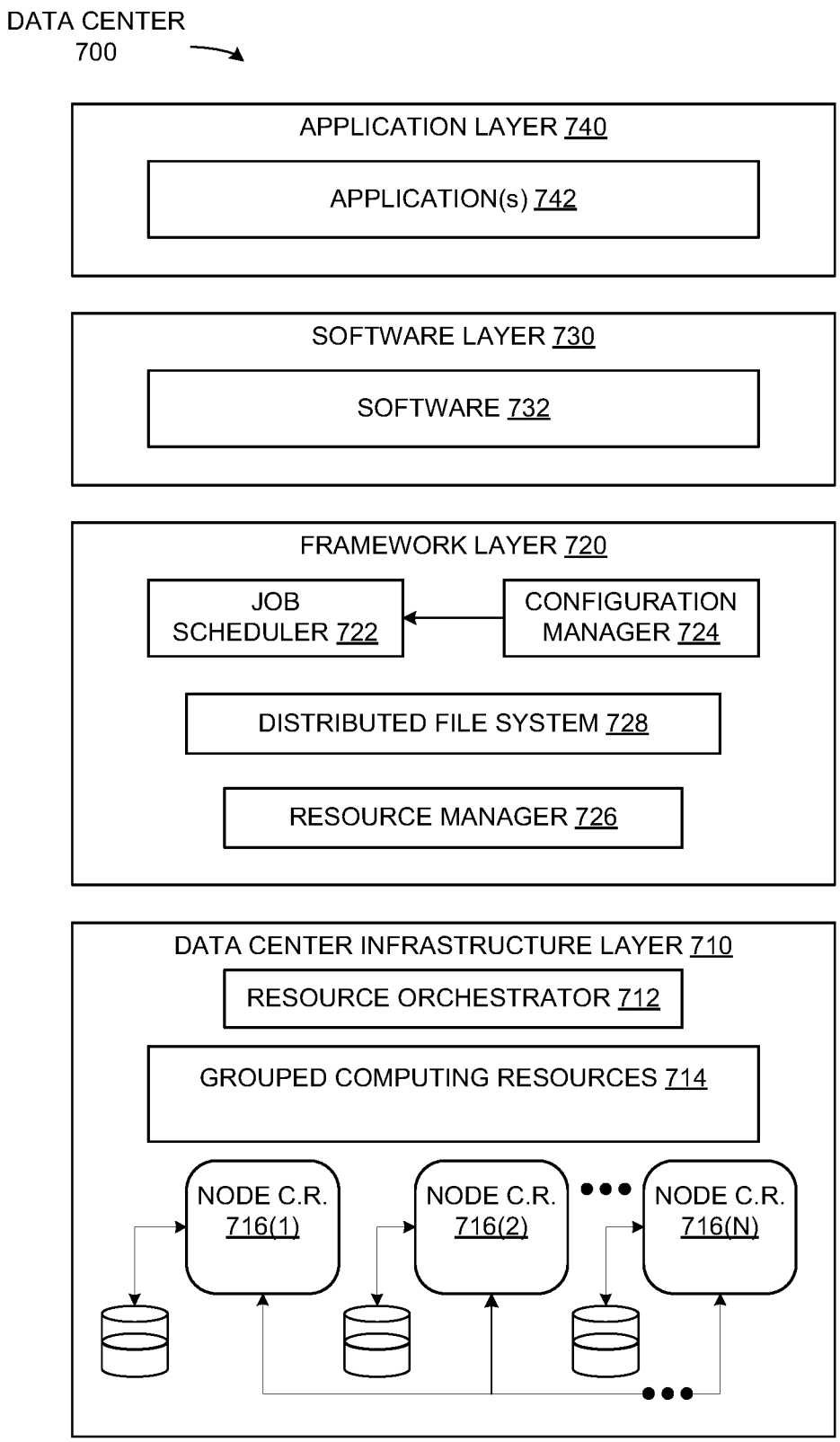
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may use distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for establishing secure connections.

Computer Systems

Figure 8:
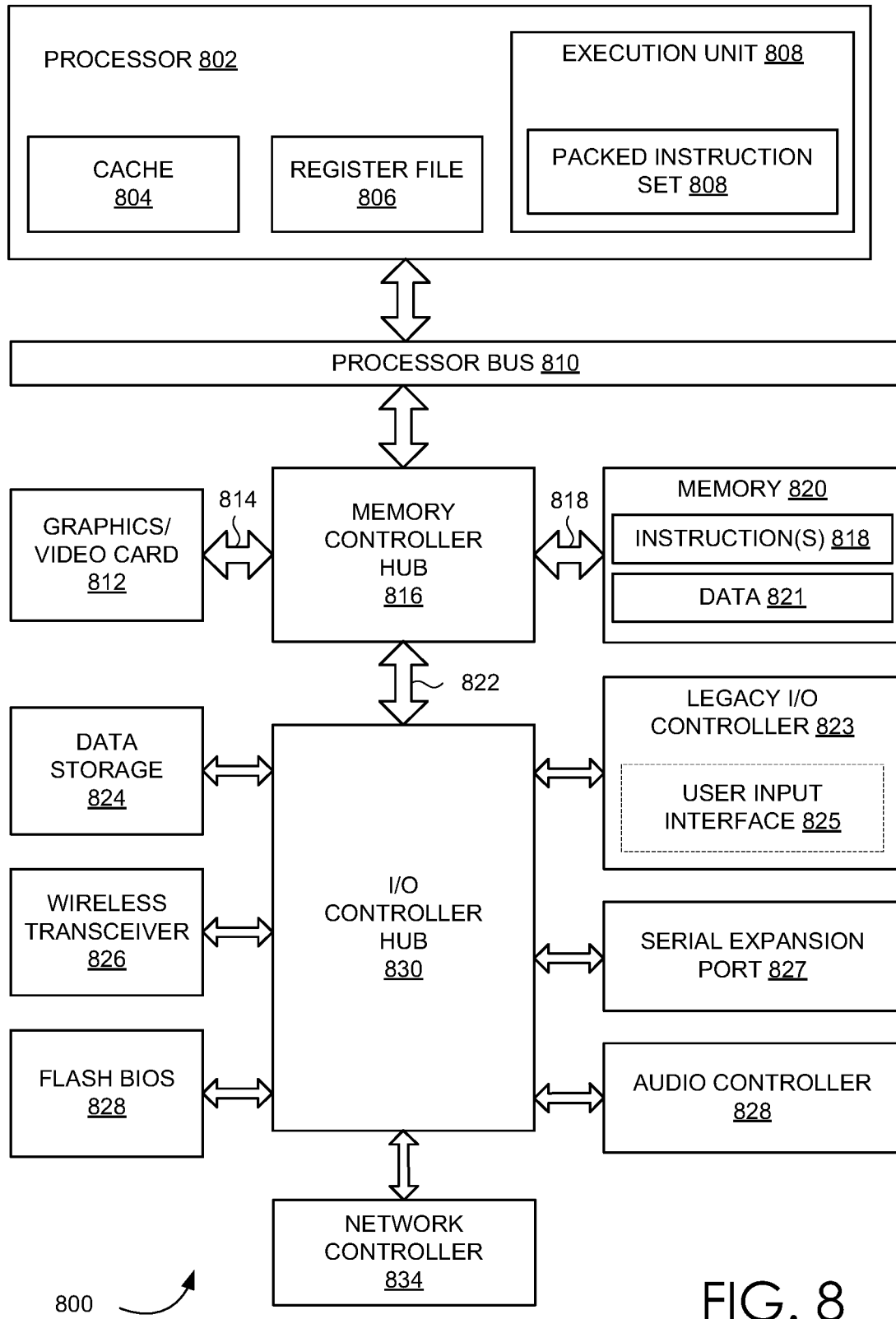
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for establishing secure connections.

Figure 9:
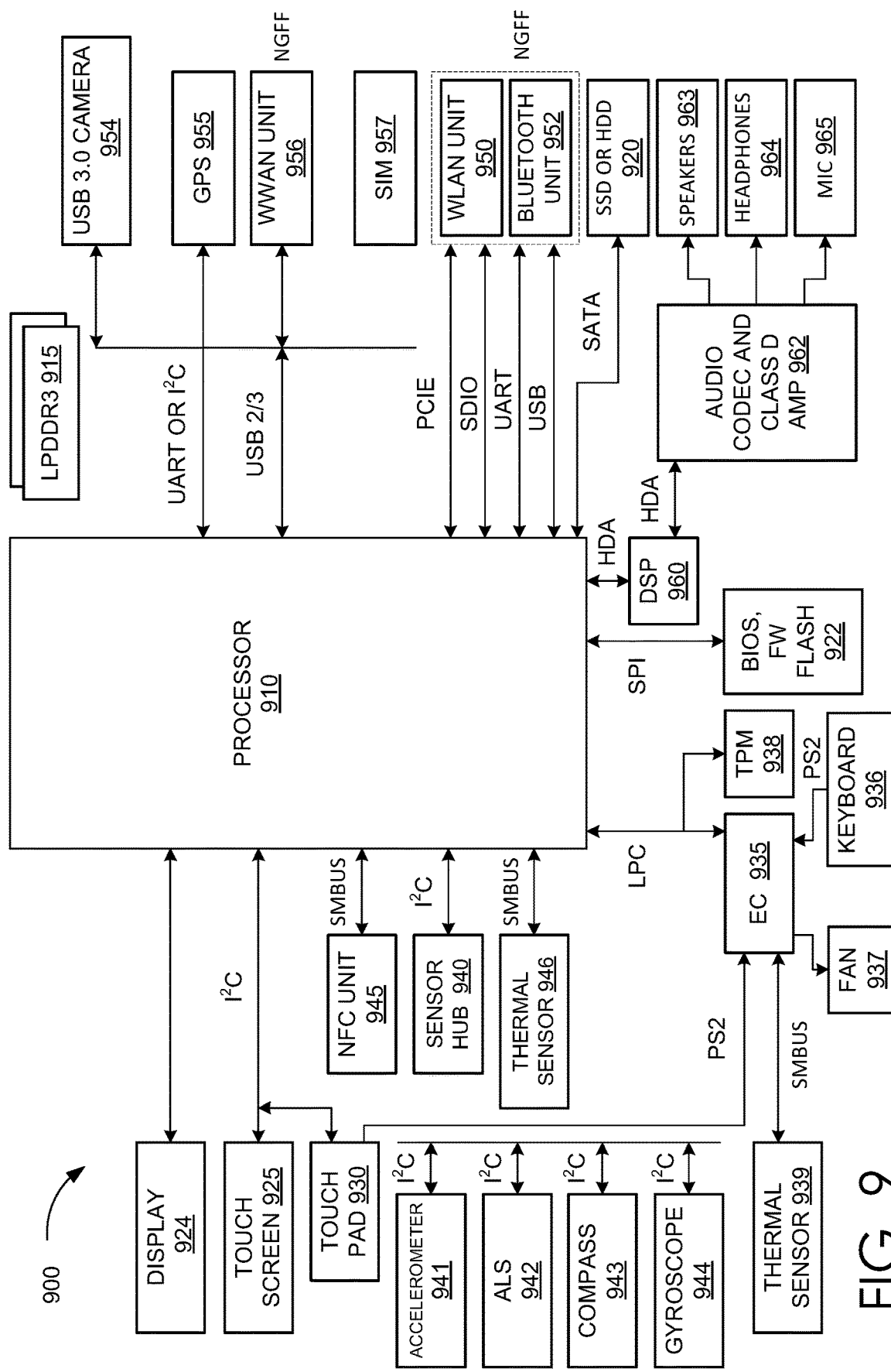
FIG. 9 illustrates a computer system, according to at least one embodiment.

FIG. 9 is a block diagram illustrating an electronic device 900 for using a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for establishing secure connections.

Figure 10:
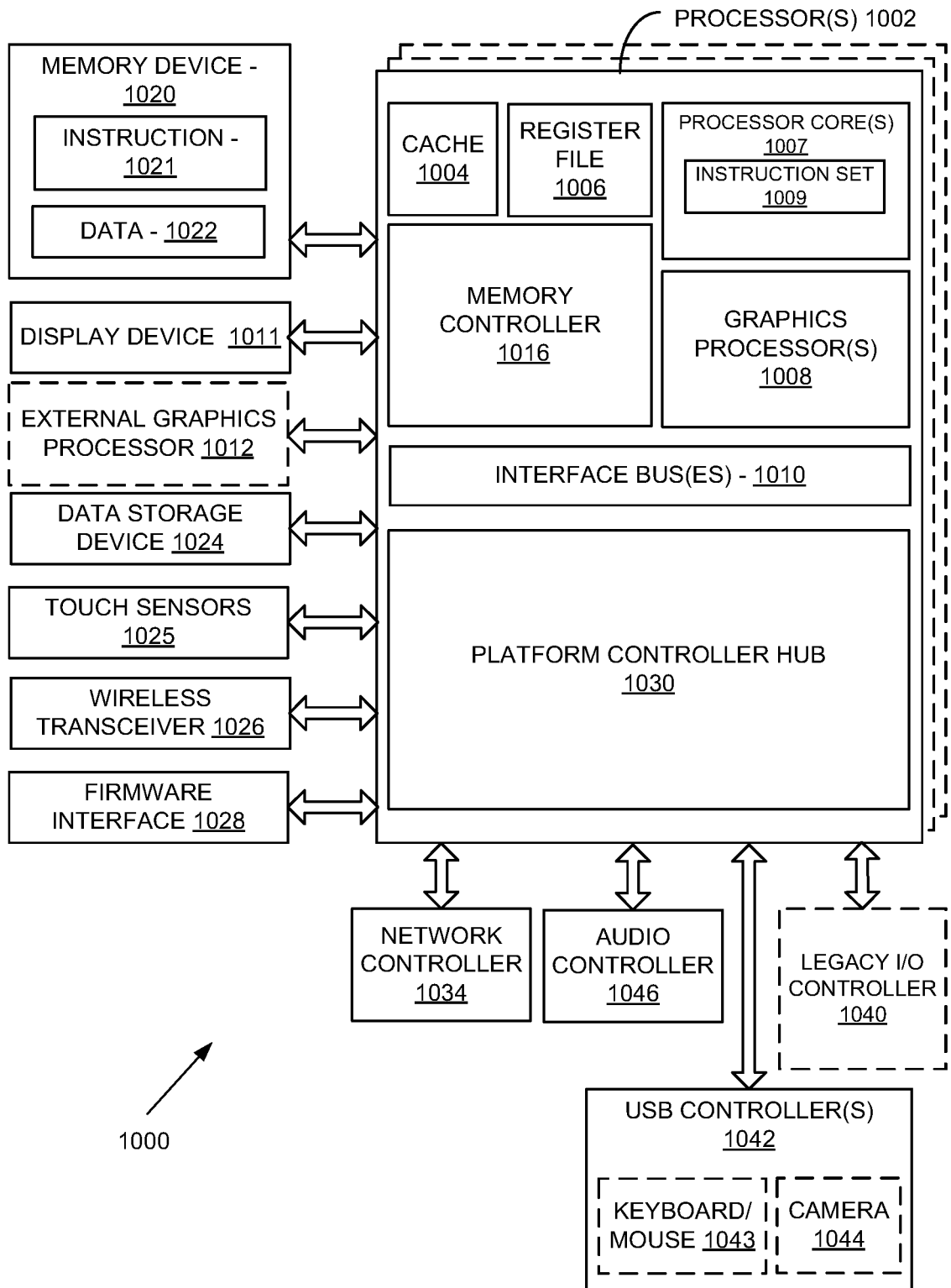
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for establishing secure connections.

Figure 11:
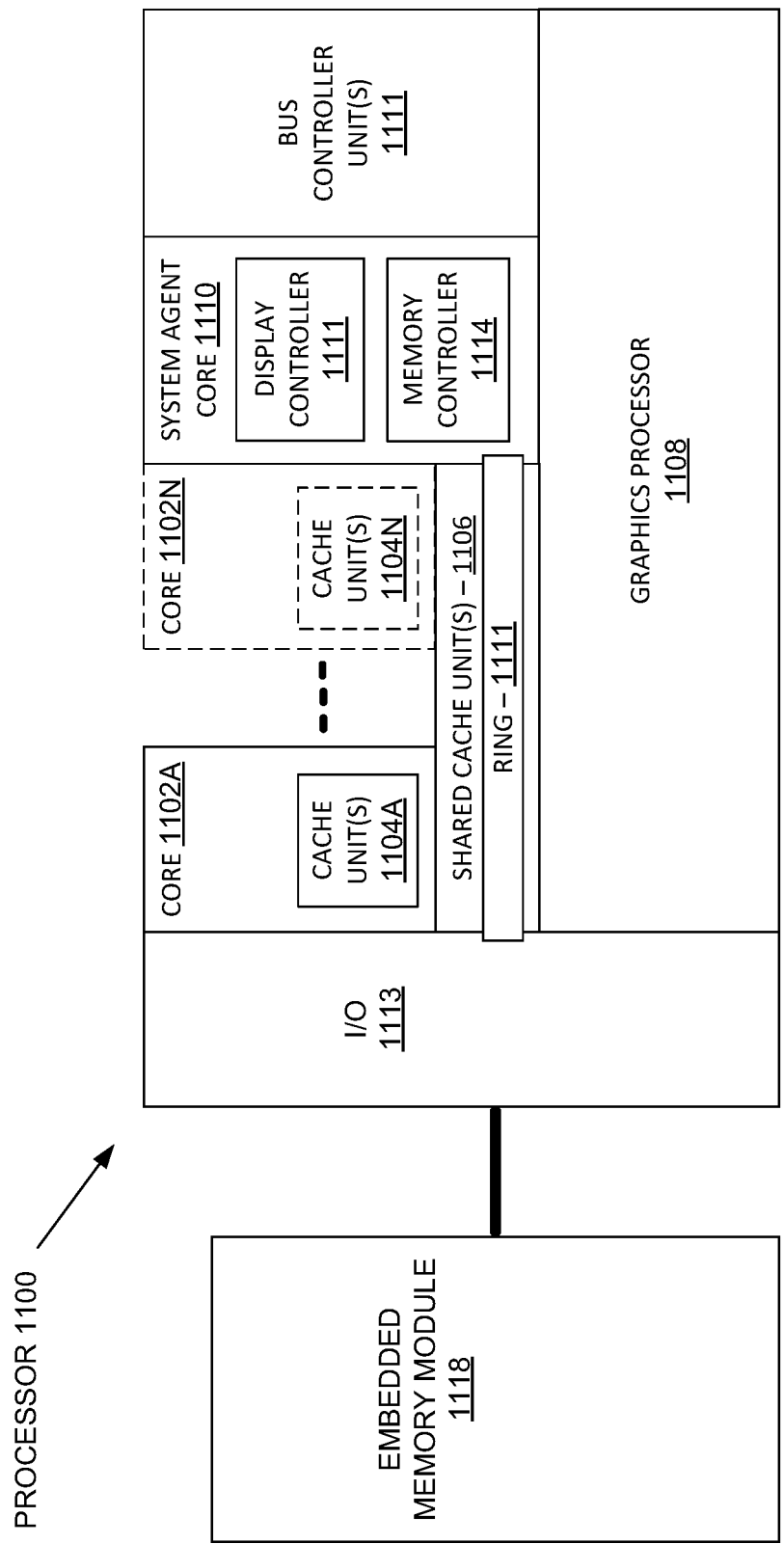
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for establishing secure connections.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:
one or more processing units to:
receive, using an interface hosted by a cloud service, a request to create a remote access session between the cloud service and an edge device, the cloud service permitting the remote access session to be created;
cause, by the cloud service, credential data to be transmitted to the edge device responsive to receiving the request;
cause, by the edge device, a secure tunnel to be established between the edge device and the cloud service; and
establish, using the secure tunnel, a connection between the cloud service and the edge device using the credential data.

2. The system of claim 1, wherein the edge device is positioned behind a firewall, and the secure tunnel allows the connection to bypass the firewall.

3. The system of claim 1, wherein the credential data includes, at least in part, a declarative chart of credentials.

4. The system of claim 1, wherein the edge device forms a portion of a cluster of edge devices associated with a node.

5. The system of claim 1, wherein the interface is associated with a unique DNS URL after the secure tunnel is established.

6. The system of claim 1, wherein the one or more processing units are further to monitor one or more properties of the secure tunnel.

7. The system of claim 6, wherein the one or more processing units are further to terminate the secure tunnel when it is determined that at least one property of the one or more properties exceeds a threshold.

8. The system of claim 1, wherein the system is comprised in at least one of:
a human-machine interface system of an autonomous or semi-autonomous machine;
a system for performing conversational AI operations;
a system for performing simulation operations;
a system for performing digital twin operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

9. A method, comprising:
receiving, via a management interface hosted by a cloud service, first data indicative of a first request to create a remote access session with the cloud service, the cloud service permitting the remote access session to be created based on the received first data;
receiving, from the management interface cloud service, credential data associated with the first request;
establishing a secure tunnel to the cloud service using at least a portion of the credential data; and
receiving, from the cloud service via the secure tunnel, second data indicative of a second request to execute an operation associated with the cloud service; and
executing the operation.

10. The method of claim 9, further comprising:
providing an edge credential to the cloud service to cause authentication of an edge device; and
authenticating the cloud service based, at least in part, on a cloud service credential.

11. The method of claim 9, wherein the secure tunnel is a communication tunnel to permit egress of information from an edge device and to block ingress of information to the edge device.

12. The method of claim 9, further comprising monitoring one or more properties of the secure tunnel after the secure tunnel is established.

13. The method of claim 9, further comprising:
receiving data indicative of a determination that a threshold period of time has passed after establishing the secure tunnel; and
closing the secure tunnel.

14. The method of claim 9, wherein the secure tunnel is associated with a generated unique DNS URL.

15. The method of claim 14, wherein the second request is received from a web-based portal associated with the generated unique DNS URL.

16. A system comprising:
a management plane hosted by a network service;
a firewall;
an edge device of a plurality of edge devices forming a node of a datacenter, the edge device positioned behind the firewall; and
a remote management node associated with the datacenter, the remote management node to receive a request from the management plane to establish a secure tunnel with the edge device through the management plane, transmit credentials associated with the request to the edge device, and establish the secure tunnel between the edge device and the network service based, at least in part, on the credentials, wherein the secure tunnel is managed for the network service by the management plane.

17. The system of claim 16, wherein a first authentication event is to authenticate the network service and a second authentication event is to authenticate the edge device prior to establishing the secure tunnel.

18. The system of claim 16, wherein the secure tunnel is a web-socket connection.

19. The system of claim 18, wherein the network service establishes a secure connection corresponding to a secure shell protocol (SSH) connection with the edge device.

20. The system of claim 16, wherein the edge device is to receive, via the secure tunnel, a command to execute one or more machine-learning based applications.

* * * * *